US012780664B2

(12) United States Patent
Zhan et al.

(10) Patent No.: US 12,780,664 B2
(45) Date of Patent: Nov. 3, 2026

(54) CONVERTING STRANDED NATURAL GAS TO CARBON PARTICLES

(71) Applicant: Saudi Arabian Oil Company, Dhahran (SA)

(72) Inventors: Guodong Zhan, Dhahran (SA); Bodong Li, Dhahran (SA); Abdulwahab S. Aljohar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 543 days.

(21) Appl. No.: 18/082,090

(22) Filed: Dec. 15, 2022

(65) Prior Publication Data

US 2024/0199424 A1 Jun. 20, 2024

(51) Int. Cl.

| | |
|---|---|
| ***C01B 32/162*** | (2017.01) |
| ***B01J 6/00*** | (2006.01) |
| ***B01J 21/04*** | (2006.01) |
| ***B01J 23/745*** | (2006.01) |
| ***B01J 23/755*** | (2006.01) |
| ***B01J 37/02*** | (2006.01) |
| ***B01J 37/08*** | (2006.01) |
| ***B01J 37/16*** | (2006.01) |

(52) U.S. Cl.

CPC ............. *C01B 32/162* (2017.08); *B01J 6/008* (2013.01); *B01J 21/04* (2013.01); *B01J 23/745* (2013.01); *B01J 23/755* (2013.01); *B01J 37/0219* (2013.01); *B01J 37/0221* (2013.01); *B01J 37/0228* (2013.01); *B01J 37/0236* (2013.01); *B01J 37/0244* (2013.01); *B01J 37/088* (2013.01); *B01J 37/16* (2013.01)

(58) Field of Classification Search

CPC ......................... B01J 37/0236; B01J 37/0228; B01J 37/0244; B01J 21/04; B01J 6/008; C01B 32/162

See application file for complete search history.

(56) References Cited

U.S. PATENT DOCUMENTS

| | | | | |
|---|---|---|---|---|
| 8,092,778 | B2 | 1/2012 | Zhu et al. | |
| 8,147,765 | B2 * | 4/2012 | Muradov | B01J 19/125 422/186.21 |
| 9,856,197 | B2 | 1/2018 | Zubrin et al. | |

(Continued)

FOREIGN PATENT DOCUMENTS

| | | |
|---|---|---|
| CN | 107376918 | 11/2017 |
| CN | 111017875 | 4/2020 |

(Continued)

OTHER PUBLICATIONS

International Search Report and Written Opinion in International Appln. No. PCT/US2023/084075, dated Apr. 17, 2024, 16 pages.

(Continued)

*Primary Examiner* — Anthony J Zimmer
*Assistant Examiner* — Annette Phan
(74) *Attorney, Agent, or Firm* — Dinsmore & Shohl LLP

(57) ABSTRACT

A system and method for converting natural gas to carbon particles are provided. An exemplary method includes feeding the natural gas to a CNT reactor, forming an effluent stream including the carbon particles, separating the carbon particles from the effluent stream, forming a produced gas stream, combusting the produced gas stream to heat the CNT reactor, and providing the carbon particles.

15 Claims, 3 Drawing Sheets

(56) References Cited

U.S. PATENT DOCUMENTS

| | | | |
|---|---|---|---|
| 10,160,708 | B2 | 12/2018 | Lee et al. |
| 2009/0208403 | A1 | 8/2009 | Hussain et al. |
| 2012/0037363 | A1 | 2/2012 | Curole |
| 2013/0109888 | A1 | 5/2013 | Moon et al. |
| 2014/0357901 | A1 | 12/2014 | Kooijman |
| 2018/0086984 | A1 | 3/2018 | Chen et al. |
| 2018/0155261 | A1 | 6/2018 | Raterman |
| 2022/0089442 | A1 | 3/2022 | Zarabian et al. |
| 2023/0347321 | A1 | 11/2023 | Alhajri et al. |
| 2024/0199517 | A1 | 6/2024 | Zhan et al. |
| 2024/0200204 | A1 | 6/2024 | Zhan et al. |

FOREIGN PATENT DOCUMENTS

| | | | |
|---|---|---|---|
| CN | 112705208 | 4/2021 | |
| CN | 113115580 A * | 7/2021 | ............ C23C 28/04 |
| CN | 113929054 | 1/2022 | |
| JP | 2000169411 | 6/2000 | |
| WO | WO 2013181045 | 12/2013 | |
| WO | WO 2015055349 | 4/2015 | |
| WO | WO 2021152614 | 8/2021 | |

OTHER PUBLICATIONS

International Search Report and Written Opinion in International Appln. No. PCT/US2023/084090, dated Apr. 24, 2024, 18 pages.

Lin et al., "Vertically Aligned Carbon Nanotubes for Thermal Interface Materials: Quality Control, Alignment Improvement and Laser Flash Measurement," 2010 Proceedings 60th Electronic Components and Technology Conference (ECTC), Jun. 1-4, 2010, pp. 967-972, 6 pages.

Lin et al., "Vertically Aligned Carbon Nanotubes on Copper Substrates for Applications as Thermal Interface Materials: from Synthesis to Assembly," 2009 Electronic Components and Technology Conference, May 26-29, 2009, pp. 441-447, 7 pages.

Wang et al., "Exergy analysis of methane cracking thermally coupled with chemical looping combustion for hydrogen production," Applied Energy, Apr. 15, 2016, 168:1-12, 12 pages.

International Search Report and Written Opinion in International Appln. No. PCT/US2023/083531, dated Mar. 28, 2024, 12 pages.

als.lbl.gov [online], "An Atomic-Level Understanding of Copper-Based Catalysts," Lawrence Berkley National Laboratory, May 2016, retrieved on Aug. 4, 2023, retrieved from URL <https://als.lbl.gov/an-atomic-level-understanding-of-copper-based-catalysts/>, 6 pages.

Chen et al., "Rational Design of Novel Catalysts with Atomic Layer Deposition for the Reduction of Carbon Dioxide," Advanced Energy Materials, 2019, 9:1900889-1900889, 26 pages.

Giglio et al., "Integration between biomass gasification and high-temperature electrolysis for synthetic methane production," Biomass and Bioenergy, 2021, 148:106017-106029, 12 pages.

Khandan et al., "Direct production of dimethyl ether from synthesis gas utilizing bifunctional catalysts," Applied Petrochemical Research, 2012, 1:21-27, 7 pages.

Lv et al., "Recent Progresses in Constructing the Highly Efficient Ni Based Catalysts With Advanced Low-Temperature Activity Toward CO2 Methanation," Frontiers in Chemistry, Apr. 2020, 8(269):1-32, 32 pages.

Otaraku et al., "Process Design of Associated Natural Gas to Dimethyl Ether Production Via Direct Synthesis," International Journal of Chemical and Process Engineering Research, 2017, 5(1):1-7, 8 pages.

Rao et al., "Carbon Nanotubes and Related Nanomaterials: Critical Advances and Challenges for Synthesis toward Mainstream Commercial Applications," ACS Nano, 2018, 12:11756-11784, 29 pages.

* cited by examiner

CONVERTING STRANDED NATURAL GAS TO CARBON PARTICLES

TECHNICAL FIELD

This disclosure relates to the direct conversion of methane to carbon particles.

BACKGROUND

Natural gas and oil are often found together. However, about 40% to 60% of the world's natural gas reserves are trapped and cannot be used locally. Accordingly, about 4,500 trillion cubic feet of natural gas is stranded with little economic value.

Methane is the main component of natural gas, accounting for about 87% of the volume. Although flaring the natural gas is an option, this will generate significant amounts of carbon dioxide. Upgrading low-value natural gas to higher value products, for example, in the field, is a promising solution for utilizing this stranded resource.

SUMMARY

An embodiment disclosed herein provides a method for converting natural gas to carbon particles. The method includes feeding the natural gas to a CNT reactor, forming an effluent stream including the carbon particles, separating the carbon particles from the effluent stream, forming a produced gas stream, combusting the produced gas stream to heat the CNT reactor, and providing the carbon particles.

Another embodiment described herein provides a system for converting natural gas to carbon particles. The system includes a purified natural gas feed, a CNT reactor to form carbon particles from the purified natural gas feed, a separator to separate an effluent stream from the CNT reactor into the carbon particles and a produced gas, and a combustion chamber to combust the produced gas with an oxidant gas forming an exhaust stream.

DETAILED DESCRIPTION

Embodiments described herein provide a method and process to convert stranded natural gas or flare gas in oilfields to valuable carbon particles according to the following reaction:

$$CH_4 \longrightarrow C(s) + 2\,H_2$$

The reaction is performed using a low-cost sacrificial catalyst including a transition metal-based catalyst prepared by atomic layer deposition. As used herein, carbon particles include single walled nanotubes, double walled nanotubes, and nanoscale or microscale particles of other carbon allotropes, such as graphene, carbon black, and nanoscale carbon structures, including $C_{60}$ carbon balls. The form of the products can be controlled by the catalyst, as described herein.

A modular reactor system is used for the conversion, including a carbon nanotube (CNT) reactor holding a catalyst designed for forming CNTs from methane. In some embodiments, hydrogen formed from the reaction is combusted to provide heat to the process.

The technology described herein could be applied to other reservoirs where stranded natural gas can be used to make CNTs. As the techniques capture and process natural gas that would otherwise be flared, they enhance the economics of the production, and reduce pollutants formed from the production.

Figure 1:
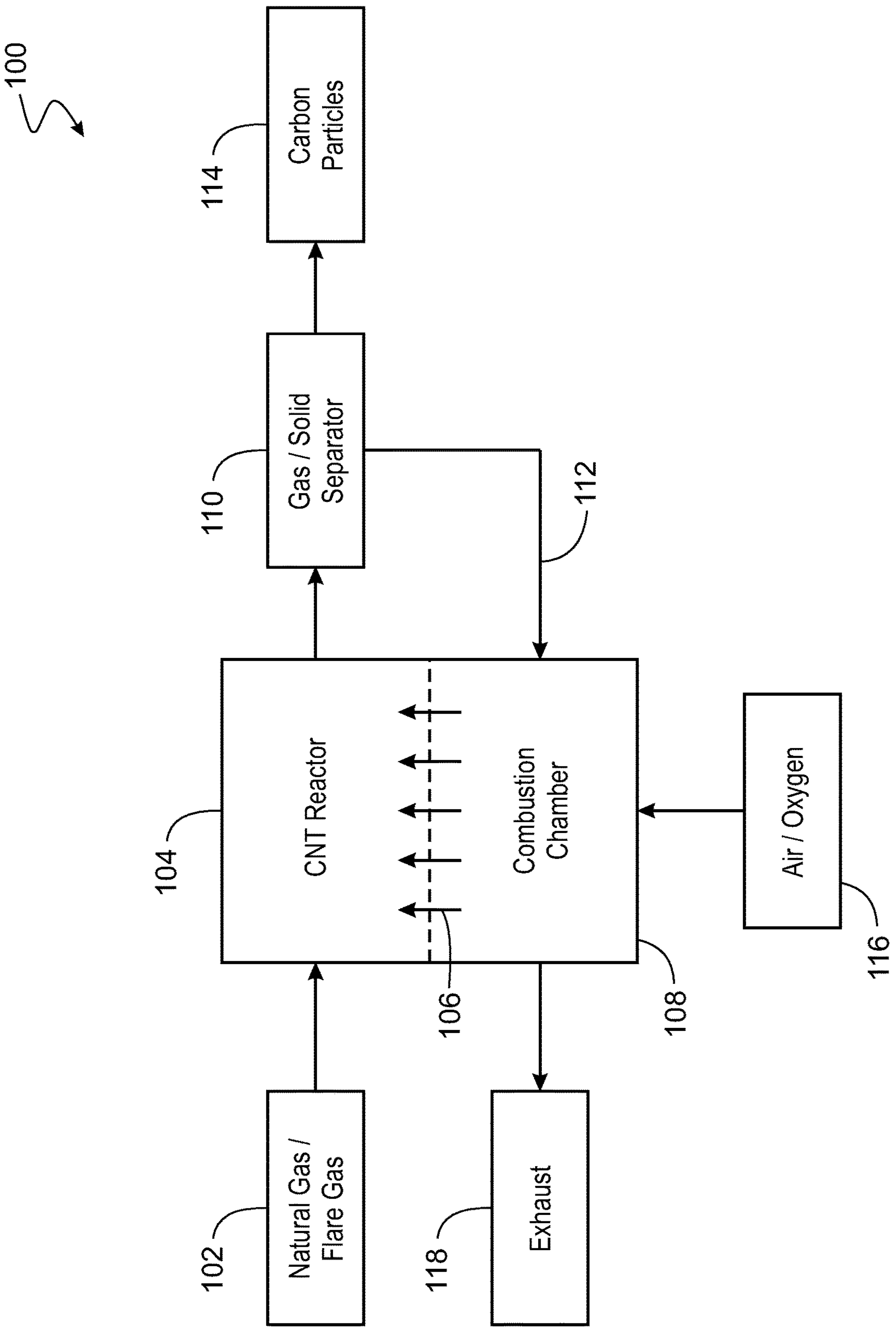
FIG. 1 is a simplified block diagram of a system 100 for forming carbon particles from natural gas.

FIG. 1 is a simplified block diagram of a system 100 for forming carbon particles from natural gas. The system 100 can be a modular reactor system, for example, mounted on a skid, which can be transported to a field for use.

The system 100 is fed natural gas 102, for example, stranded natural gas from an oil or gas field. The natural gas 102 can be purified before use, for example, by the removal of acid gases such as hydrogen sulfide or carbon dioxide in an adsorption unit. In some embodiments, the adsorption unit (not shown) is a column of molecular sieves, such as zeolites. Generally, two columns are used, with the process alternating between each column, wherein one column is adsorbing impurities while the other column is being regenerated. In other embodiments, the adsorption unit is a countercurrent column using a lean amine stream as an absorbent. A regeneration column is then used to strip the acid gases from a rich amine stream formed during the process, regenerating the lean amine stream.

The natural gas 102 is fed to a CNT reactor 104. The CNT reactor 104 includes a catalyst, for example, iron, nickel, or aluminum metal domains, deposited on an alumina surface, as described below. The CNT reactor 104 is operated at temperatures of between about 400° C. and about 500° C. and low pressure, such as about 5 psig to about 50 psig. The CNT reactor 104 is heated by heat 106 provided by a combustion chamber 108.

The effluent 105 from the CNT reactor 104 is cooled and fed to a gas/solid separator 110. In some embodiments, the gas/solid separation 110 is a cyclonic separator that allows the produced gas 112 to exit through a top port while allowing the carbon particles 114, such as the CNTs, to exit through a bottom port, such as an intermittent or rotating airlock. The carbon particles 114 can then be sold as a product stream. In addition to providing a valuable product, the solid form of the carbon particles 114 provides lower shipping costs than a vapor of liquid product.

The produced gas 112 includes hydrogen and unreacted methane, as well as small amounts of other gases, such as nitrogen or helium, that may be present. The produced gas 112 is combusted in the combustion chamber 108 to provide the heat 106 for the process, as described herein. Oxygen or air 116 is fed to the combustion chamber to combust the produced gas 112, forming an exhaust 118. In some embodiments, the resulting exhaust gases can be vented.

In some embodiments, the CNT reactor 104 is a tubular reactor with a catalyst disposed on an interior surface of the tubes. The exterior surface of the tubes is within the combustion chamber 108. In other embodiments, the CNT reactor 104 is a fluidized bed reactor in which the natural gas fluidizes catalyst particles. In this embodiment, the combustion chamber 108 surrounds vertical tubes that hold the fluidized catalyst particles.

The catalyst used for the CNT reaction includes an alumina surface that is generated by atomic layer deposition of alumina over a substrate. A catalytically active metal, such as nickel or iron, is deposited on the alumina. In various embodiments, the catalytically active metal includes iron, aluminum, titanium, or nickel, among others. The formation of the catalyst is described further with respect to FIGS. 2A and 2B.

Figure 2A:
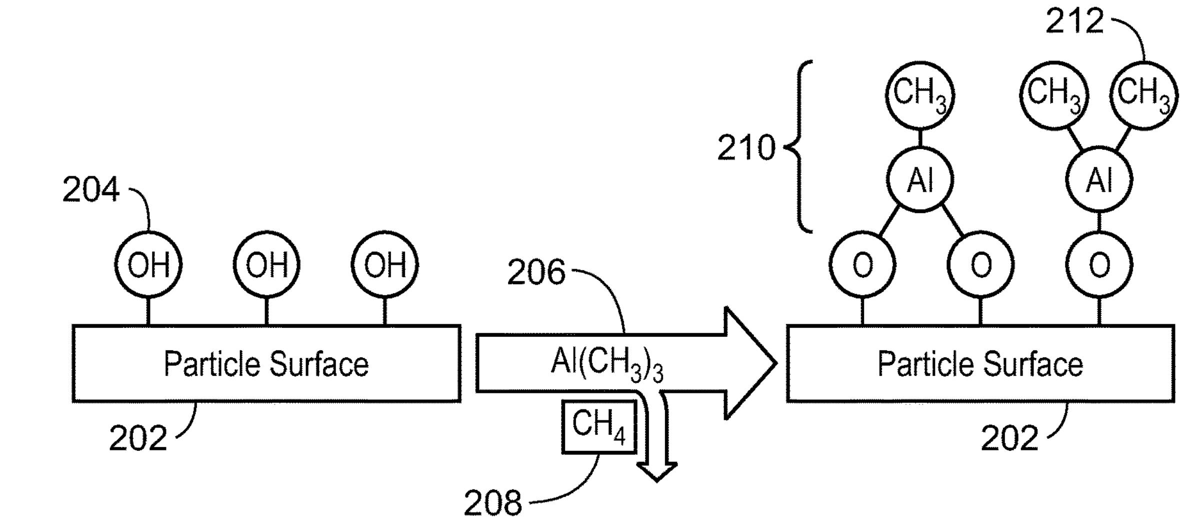
FIGS. 2A and 2B are drawings of the surface of the catalyst showing the deposition of atomic layers of alumina on a surface to form a catalyst.
Figure 2B:
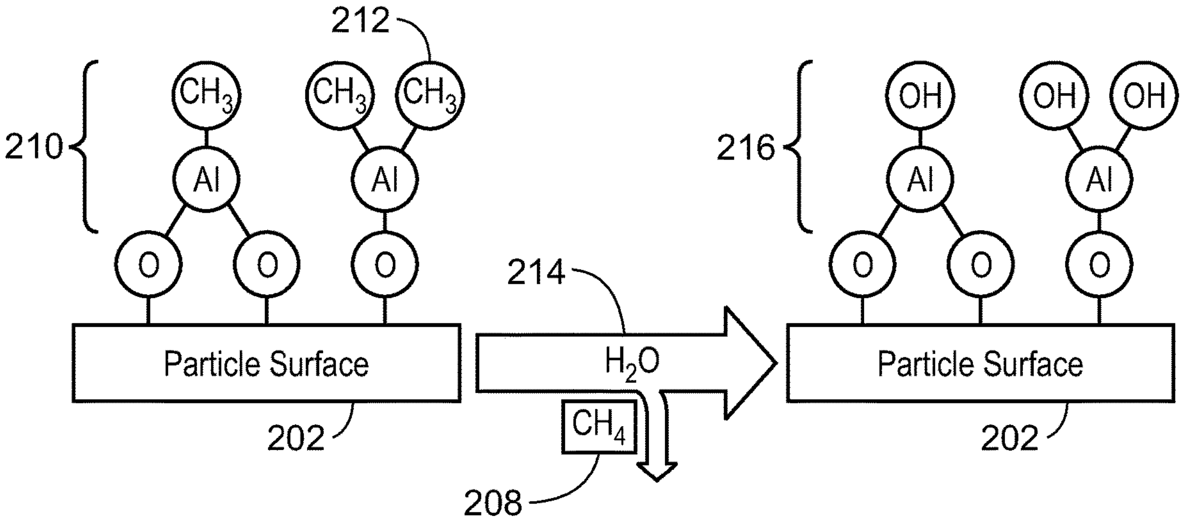

FIGS. 2A and 2B are drawings of the surface of the catalyst showing the deposition of atomic layers of alumina to form a catalyst. This process is used to generate the catalyst for the CNT reaction. As shown in FIG. 2A, a catalyst support 202 has hydroxyl groups 204. In various embodiments, the catalyst support 202 is formed from silica, alumina, or another metal oxide. The catalyst support 202 may be a particulate or a solid surface of an interior of a tube. The particulate can be chosen to lower catalyst costs, such as using a silica sand.

The particle is treated by contact with an excess of trimethyl aluminum (TME) ($Al(CH_3)_3$), 206. The TME 206 reacts with the hydroxyl groups 204, releasing methane 208, and forming a layer 210 over the catalyst support 202 that has methyl groups 212 as the outer surface. The reaction is limited by the number of hydroxyl groups 204, first slowing, and then stopping as the hydroxyl groups 204 are exhausted. For example, the surface reaction may include 90% of the hydroxyl groups 204, 95%, 99%, or higher, depending on contact time.

FIG. 2B shows the second step of the reaction. After the TMA treatment, the catalyst support 202 is further treated by contact with an excess of water 214. The water 214 reacts with the methyl groups 212, releasing further methane 208, and forming a layer of alumina 216 over the catalyst support 202. As for the reaction in FIG. 2A, the reaction in FIG. 2B is limited by the number of methyl groups 212, first slowing, and then stopping as the methyl groups 212 are exhausted. As this is a very active reaction, most, or all, of the methyl groups 212 will be displaced. The surface reaction may include 95% of the methyl groups 312, 99%, or higher, depending on contact time. The reactions in FIGS. 2A and 2B may be iterated to form additional layers over the catalyst support 202, such as one layer of alumina 216, two layers of alumina 216, three layers of alumina 216, or more.

For a catalyst support 202 in a particulate form, the iteration of the procedure described by FIGS. 2A and 2B produces a coated particle. In some embodiments, the size of the coated particle is about 20 nm to about 30 nm in size. The coated particle may be larger, for example, about 100 nm to about 500 nm, or larger, depending on the fluidization flow. Larger particles may lower the amount of material carried over, while smaller particles provide higher surface area. If the catalyst support 202 is a particulate, the reactions shown in FIGS. 2A and 2B can be performed in a fluidized bed reactor or a rotary reactor, among others.

Once the desired number of layers have been deposited, other catalysts may be deposited over the alumina surface of the catalyst support 202, such as copper oxide/zinc oxide, nickel, platinum, palladium, or ruthenium, or other metals as described herein. In some embodiments, the additional metals are deposited by mixing the catalyst support 202 with a solution of the target metal as a salt, then drying the solution, and calcining to form the final catalyst For example, to form a catalyst with nickel domains, the catalyst support 202 can be treated by immersion in a solution of an nickel salt, such as solution of nickel nitrate ($Ni(II)(NO_3)_2$). The catalyst support 202 is then removed from the solution, or the solution is drained from the reactor, and the catalyst support 202 is dried, for example, being heated at a temperature of between 50° C. and 100° C., or at a temperature of less than about 100° C. After drying, the catalyst support 202 may be calcined at a higher temperature, such as between 500° C. and 700° C. A reducing atmosphere, such as a mixture of nitrogen and hydrogen, is used to reduce the nickel to the metallic form, producing nickel metal domains over the surface. Similar procedures using iron salts, titanium salts, or aluminum salts may be used to produce domains of other metals.

The size of the domains may be controlled by the amount of the nickel solution used, and the number of repetitions of the treatment with the solution. The size of the domains is used to control the size of the carbon particles produced. Smaller domains, such as less than about 5 nm, or about 2-3 nm, may be used to form single walled nanotubes. Somewhat larger domains, such as between 5 nm and 10 nm, may be used to form multiple wall nanotubes. Yet larger domains, for example, greater than about 50 nm, may be used to form larger carbon particles, such as carbon black.

In some embodiments, a continuous film is formed by multiple cycles of addition of the solution, each followed by treatment in a reducing atmosphere. Similar processes may be used to add domains of other metals, such as nickel or aluminum, among others. The treatment with the solution may be performed with the coated particles in a fluidized state, wherein the metal salt solution is entrained with the gas use for the fluidization.

Figure 3:
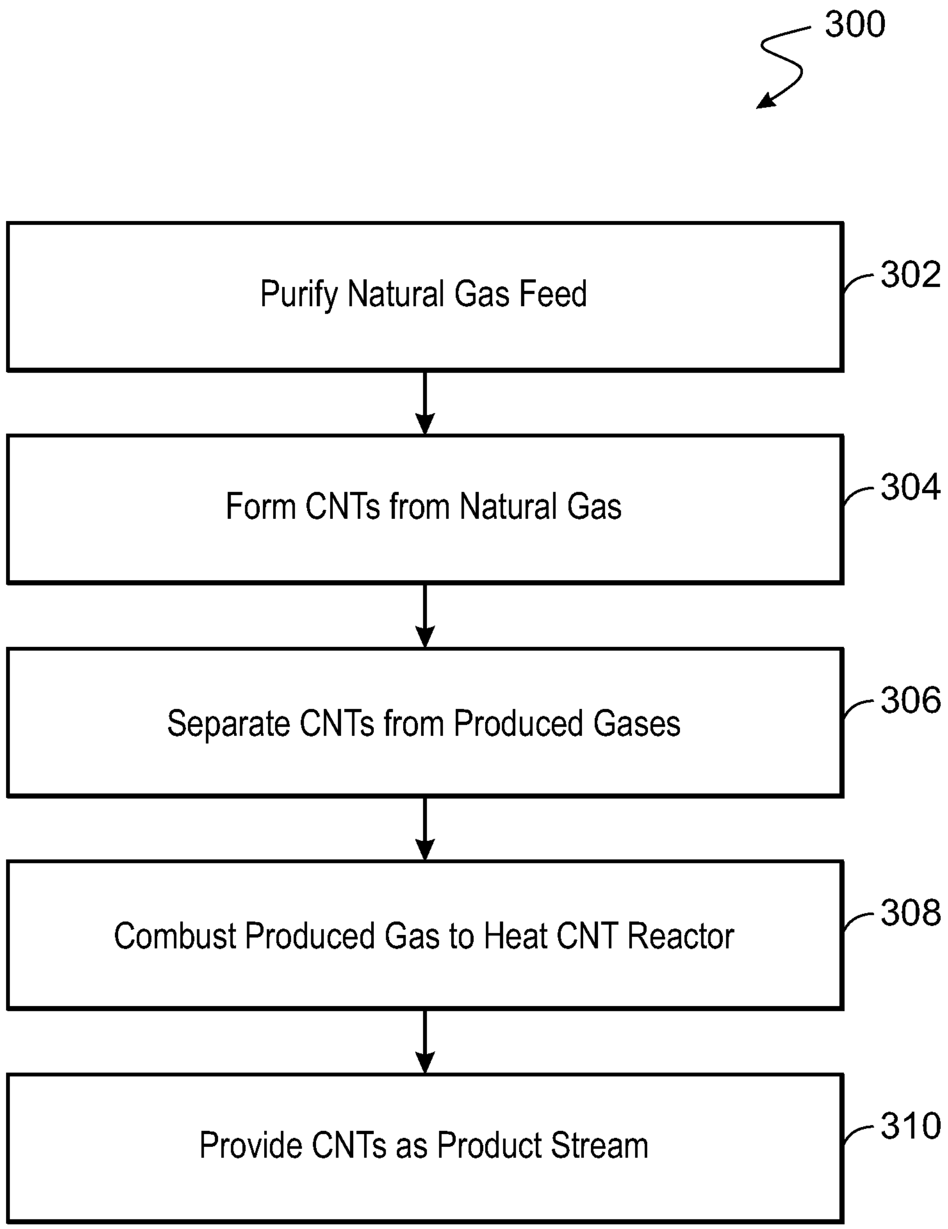
FIG. 3 is a block diagram of a method 300 for forming carbon particles from natural gas.

FIG. 3 is a block diagram of a method 300 for forming carbon particles from natural gas. The method 300 begins at block 302 with the purification of a natural gas feed. As described herein, the natural gas may include contaminants such as hydrogen sulfide. In various embodiments, the hydrogen sulfide is removed using an amine absorption system, a zeolite adsorption column, and the like. Other contaminants can include mercury, arsenic, or chlorine, which may be removed by similar techniques. In some embodiments, higher hydrocarbons are separated from the methane to form a higher purity feed. This may increase the purity of the carbon particles, as higher carbon feedstocks may increase coking and the formation of other types of carbon particles, such as carbon black.

At block 304, the natural gas feed is fed to a CNT reactor to form the carbon particles. This is performed by reacting the methane on the surface of the catalyst. If a fluidized bed reactor is used, the turbulence of the catalyst will break the carbon particles from the catalyst, and carry them out with the produced gas.

At block 306, the carbon particles are separated from the produced gas. As described herein, this may be performed in a cyclonic separator. Other separation techniques may be used, including a settling chamber, a filtration system, and the like.

At block 308, the produced gas is combusted to heat the CNT reactor. As described herein, oxygen can be added to the combustion chamber for the combustion, although, air may be used if oxygen purification systems are not available. In some embodiments, carbon dioxide is isolated from the exhaust, for example, by membrane separation, and combined with the feed to the reactor to increase the production of CNTs by the Bosch reaction. In these examples, iron domains may be included with nickel domains on the catalyst to catalyze both reactions.

At block 310, the carbon particles are provided as a product. For example, the carbon particles can be stored at the site, then shipped to an end user, depending on the types of particle. CNTs can be provided to electronics manufacturers, among others. Carbon black particles can be provided to plastics additive companies, tire manufacturers, and the like.

Embodiments

An embodiment disclosed herein provides a method for converting natural gas to carbon particles. The method includes feeding the natural gas to a CNT reactor, forming an effluent stream including the carbon particles, separating the carbon particles from the effluent stream, forming a produced gas stream, combusting the produced gas stream to heat the CNT reactor, and providing the carbon particles.

In an aspect, the method includes removing impurities from the natural gas prior to feeding the natural gas to the CNT reactor. In an aspect, the impurities include hydrogen sulfide, or metals, or combinations thereof.

In an aspect, the method includes feeding air with the produced gas stream to combust the produced gas stream.

In an aspect, the method includes combusting a portion of the natural gas with the produced gas stream.

In an aspect, the method includes isolating carbon dioxide from an exhaust stream from the combustion.

In an aspect, the method includes feeding the carbon dioxide with the natural gas to the CNT reactor to form the carbon particles.

In an aspect, the method includes forming a catalyst, including: treating a particle including hydroxyl groups of a surface of the particle with an excess of trimethyl alumina to form a layer over the surface including methyl groups: and treating the particle including methyl groups at the surface with water to form a coated particle including an alumina layer.

In an aspect, the method includes iterating the treatment of the surface with the trimethyl alumina and the water to form multiple alumina layers over the coated particle.

In an aspect, the method includes forming a catalyst particle from the coated particle, including: treating the coated particle with a metal salt; drying the coated particle at a first temperature, wherein the first temperature is between about 50° C. and about 100° C.; and calcining the coated particle at a second temperature, wherein the second temperature is between about 500° C. and 700° C.

In an aspect, the calcining of the coated particle is performed in a reducing atmosphere.

In an aspect, the calcining of the coated particle is performed in an inert atmosphere.

In an aspect, the metal salt includes iron.

In an aspect, the metal salt includes nickel.

In an aspect, wherein the metal salt includes aluminum.

Another embodiment described herein provides a system for converting natural gas to carbon particles. The system includes a purified natural gas feed, a CNT reactor to form carbon particles from the purified natural gas feed, a separator to separate an effluent stream from the CNT reactor into the carbon particles and a produced gas, and a combustion chamber to combust the produced gas with an oxidant gas forming an exhaust stream.

In an aspect, the system includes a carbon dioxide separator to separate carbon dioxide from the exhaust stream.

In an aspect, the system includes a coated particle including an alumina substrate formed by atomic layer deposition.

In an aspect, the system includes metal domains deposited on the coated particle.

In an aspect, the metal domains include iron.

In an aspect, the metal domains include nickel.

Other implementations are also within the scope of the following claims.

What is claimed is:

1. A method for converting natural gas to carbon particles, comprising:

feeding the natural gas to a CNT reactor comprising a catalyst, thereby converting the natural gas into an effluent stream comprising the carbon particles and hydrogen;

separating the carbon particles from the effluent stream, thereby forming a produced gas stream comprising the hydrogen and a product stream comprising the carbon particles;

combusting the hydrogen of the produced gas stream to heat the CNT reactor; and providing the carbon particles.

2. The method of claim 1, comprising removing impurities from the natural gas prior to feeding the natural gas to the CNT reactor.

3. The method of claim 2, wherein the impurities comprise hydrogen sulfide, or metals, or combinations thereof.

4. The method of claim 1, comprising feeding air with the produced gas stream to combust the produced gas stream.

5. The method of claim 1, comprising combusting a portion of the natural gas with the produced gas stream.

6. The method of claim 5, comprising isolating carbon dioxide from an exhaust stream from the combustion.

7. The method of claim 6, comprising feeding the carbon dioxide with the natural gas to the CNT reactor to form the carbon particles.

8. The method of claim 1, comprising forming a catalyst, comprising:

treating a particle comprising hydroxyl groups of a surface of the particle with an excess of trimethyl alumina to form a layer over the surface comprising methyl groups; and treating the particle comprising methyl groups at the surface with water to form a coated particle comprising an alumina layer.

9. The method of claim 8, comprising iterating the treatment of the surface with the trimethyl alumina and the water to form multiple alumina layers over the coated particle.

10. The method of claim 8, comprising forming the catalyst of the CNT reactor from the coated particle, comprising:

treating the coated particle with a metal salt;

drying the coated particle at a first temperature, wherein the first temperature is between about 50° C. and about 100° C.; and calcining the coated particle at a second temperature, wherein the second temperature is between about 500° C. and 700° C.

11. The method of claim 10, wherein the calcining of the coated particle is performed in a reducing atmosphere.

12. The method of claim 10, wherein the calcining of the coated particle is performed in an inert atmosphere.

13. The method of claim 10, wherein the metal salt comprises iron.

14. The method of claim 10, wherein the metal salt comprises nickel.

15. The method of claim 10, wherein the metal salt comprises aluminum.

* * * * *